2 Sheets--Sheet 1.
N. C. STILES.
Improvement in Drop-Hammers.
No. 130,877. Patented Aug. 27, 1872.
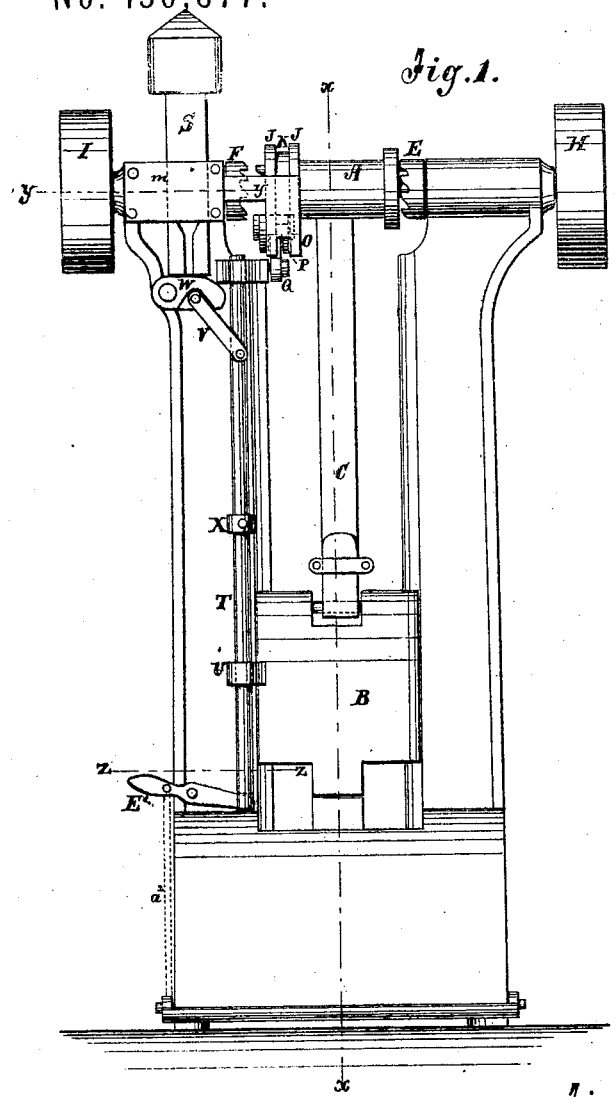
Fig. 1.
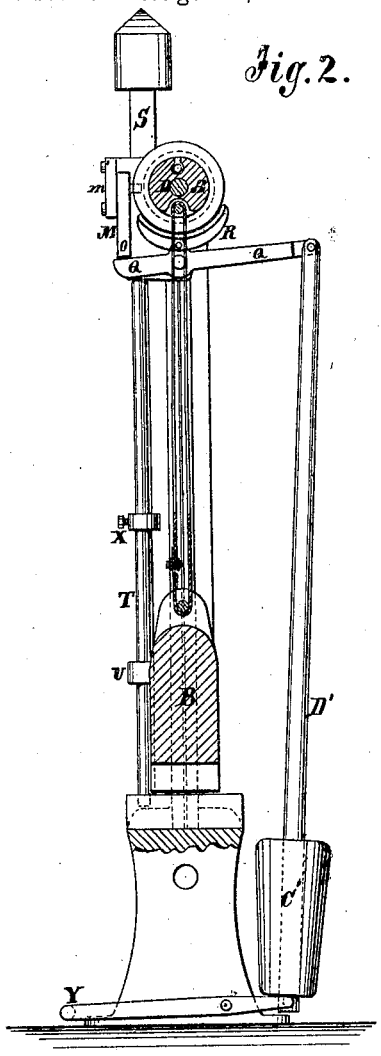
Fig. 2.
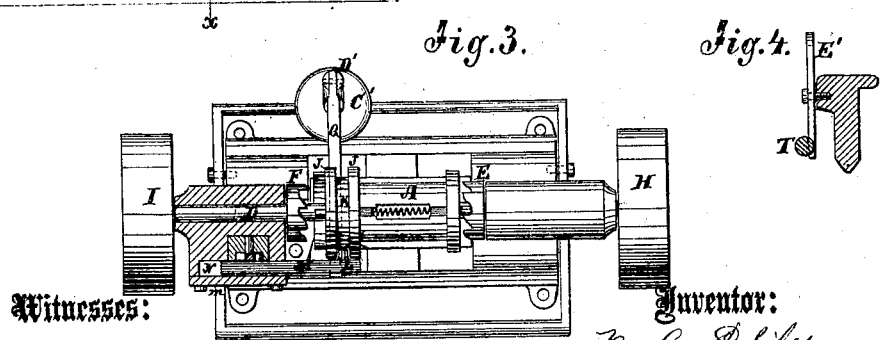
Fig. 3.
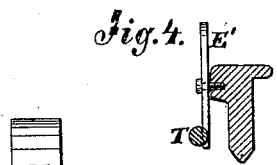
Fig. 4.
Witnesses:
A Bennerkendorf.
W. A. Graham
Inventor:
N. C. Stiles.
per
Attorneys.
AM. PHOTO-LITHOGRAPHIC CO. N.Y. (OSBORNE'S PROCESS.)

N. C. STILES.
Improvement in Drop-Hammers.
No. 130,877. Patented Aug. 27, 1872.

Witnesses:
A Bennecrendorf.
W. A. Graham

Inventor:
N. C. Stiles.
per Munn
Attorneys.

UNITED STATES PATENT OFFICE.

NORMAN C. STILES, OF MIDDLETOWN, CONNECTICUT, ASSIGNOR TO "THE STILES AND PARKER PRESS COMPANY," OF SAME PLACE.

IMPROVEMENT IN DROP-HAMMERS.

Specification forming part of Letters Patent No. 130,877, dated August 27, 1872.

Specification describing a new and Improved Drop-Press, invented by NORMAN C. STILES, of Middletown, in the county of Middlesex and State of Connecticut.

The invention consists in certain improvements upon drop hammers or presses, as hereinafter fully described and subsequently claimed.

Figure 5:
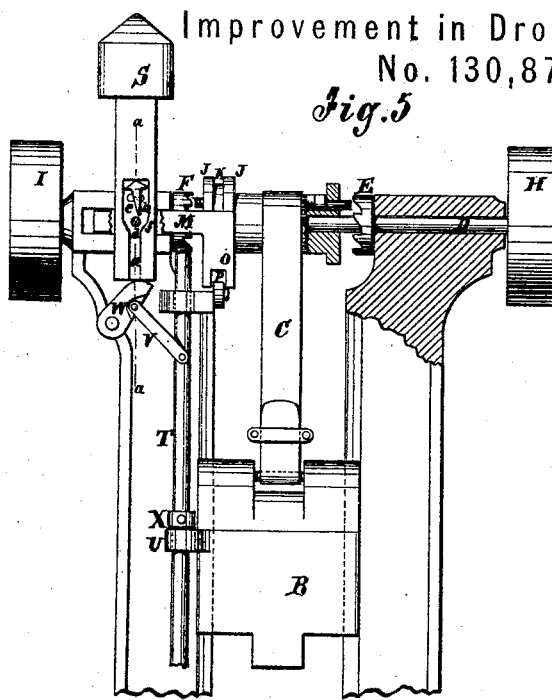
Figure 6:
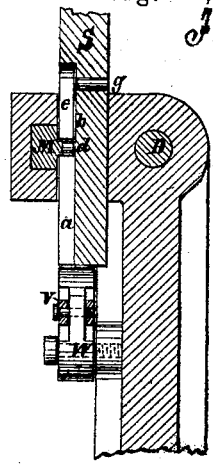
Figure 7:
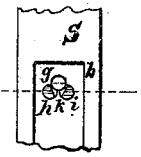
Figure 8:
Figure 9:
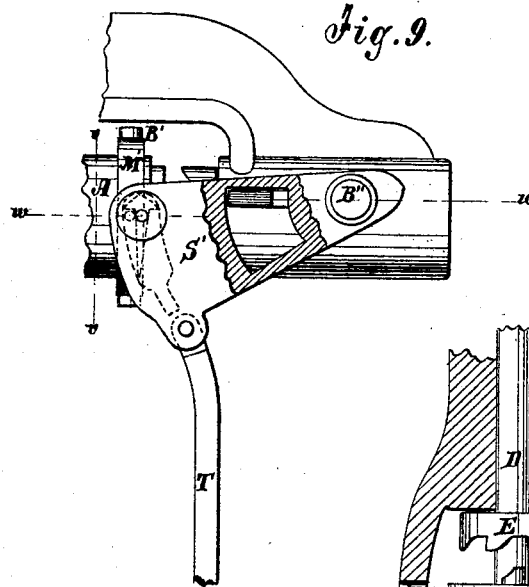
Figure 10:
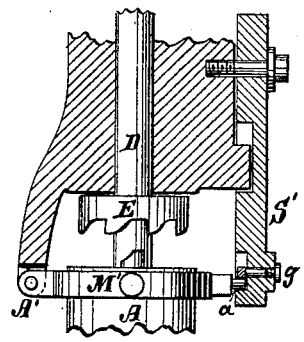

Figure 1 is a front elevation of my improved machine. Fig. 2 is a sectional elevation of the same taken on the line $x\,x$ of Fig. 1. Fig. 3 is partly a top view and partly a horizontal section, the latter being taken on the line $y\,y$ of Fig. 1. Fig. 4 is a section on the line $z\,z$ of Fig. 1. Fig. 5 is a partial front elevation with the shifting-bar removed and part of the spool and one of the bearings sectioned. Fig. 6 is a section of Fig. 5 on the line $a\,a$. Figs. 7 and 8 are details of the shifting apparatus. Fig. 9 is partly a side elevation and partly a sectional view of a modified arrangement of the shifting apparatus. Fig. 10 is a horizontal section of Fig. 9 on the line $w\,w$, and Fig. 11 is a vertical section on the line $v\,v$.

Similar letters of reference indicate corresponding parts.

A is the spool for raising the hammer B by the belt C. This spool is arranged on the shaft D so that it can turn independently of it and slide endwise, with a considerable range between the clutches E and F, with which it connects alternately. Said clutches are connected with and turned by their respective driving-wheels H and I, which turn in opposite directions and are kept constantly in motion. J is a wide collar at one end of the spool, with a groove, K, in its face, with which the pin L of a shifting-bar, M, engages to move the spool endwise for connecting and disconnecting it with the clutches, also to keep the spool clear of the clutches when the hammer falls. Said bar is mounted in a horizontal groove or way, N, in the side of the upper part of one of the housings or posts, and it has a projection, O, extending downward in front of the collar J, with a notch, P, in which the short arm of the brake-lever Q drops when the friction-brake R comes into action on the face of collar J to hold the hammer up after it has been raised and the spool disconnected. Said notch comes over the lever only when the spool is midway between the clutches, and cannot be engaged by either of them. When the spool is in any other position the lower end of projection O holds the brake away from the collar, so that it cannot possibly touch the collar when engaged with either of the clutches to avoid any interference of these parts. To have the spool turned alternately by these two driving-wheels to raise the hammer, it is necessary for the shifter M to be moved as follows: The spool being midway between the clutches at the moment the hammer begins to fall, said shifter will then move the spool—say to the right—into gear with clutch E, which raises the hammer; then said shifter will move the spool to the left far enough to disconnect it from clutch E; then, when the hammer falls again, it will move again to the left, gearing the spool with clutch F; then, after the hammer is raised, it will move to the right to the center; and then, after the hammer again falls, it will move to the right to connect with clutch E again, and so on. Now, for automatically moving this shifter in this order, I have a straight bar, S, arranged vertically, to be moved downward by a weight, and in the other direction it is moved by the hammer, which, just previous to stopping, lifts the rod T by its projection U, and said rod lifts bar S by the toggle-jointed pieces V and W, and said bar has a vertical slot, $a\,b$, in the side next to the shifting-bar M, into which a pin, $d$, on said bar projects to be acted on by the walls of said slot, and a vibrating switch, $e$, within the upper widened portion $b$, to move the said bar back and forth. This slot is widened each way from the part $a$, with slanting walls $f$ terminating in the upper widened portion $b$, in which the switch $e$ is arranged, dividing it into two channels above the oblique walls $f$, and by its vibrations causing the pin $d$ to be alternately received in each. This switch is a kind of T-shaped piece with a triangular head and a wedge-shaped stem, with the point extending downward about to the upper termination of the slanting walls $f$, and the apex of the head bearing against the upper wall of the slot. Near the junction of the stem with the head, a pivot, $g$, projects from the rear side into a hole in the bar, on which pivot it vibrates. A little below this pivot there are two oval-headed pins, $h$ $i$, let into holes in the bar S on opposite sides of and a little below the pivot $g$, the holes for which are cut through the wall of the hole for pivot $g$, as clearly shown in Fig. 7, so that said pins have to be grooved to let the pivot $g$ enter, whereby said pins are prevented from turning. These pins are notched in the outer ends, as shown at $k$, by which shoulders are formed to lock the switch and hold it from turning. The space between these shoulders is narrower than the stem of the switch in front of them, so that it can only be locked by one of the pins at once, and when so locked, the head of the other pin will be under the stem of the switch, being pushed back in its hole so that the switch can pass in front of it. A spring, $e$, is arranged behind each pin in the bottom of the hole to push it outward, but said springs can only push the pins out till the bottoms of the notches $k$ come against the switch, as they are never wholly uncovered by said switch. The switch is exactly as thick as the depth of the groove, so that the shifting-bar M, kept against it by the front plate $m$, (which, in this example, is detachable for convenience in arranging and adjusting the apparatus,) keeps it pressed against the bottom or rear wall of the groove, thereby keeping the pins in place. This may, however, be accomplished by having the pivot-pin $g$ pass through the said back wall and have a head of any kind to hold the switch, as shown in Fig. 10. At the widest part of the stem of the switch, which is next to the head, there is just space enough for the pin $d$ to pass between it and the wall on either side of the part $b$ of the groove. When the hammer rises and the lug U comes against the collar X on the rod T, the bar S is raised so that the narrow part $a$ of the groove in said bar comes up and receives the pin $d$ in it, which, in coming into $a$, is acted on by one of the walls $f$—say the one to the right—and the shifting-bar is moved to the left far enough to move the spool out of gear with clutch E, by which the hammer was raised, and to the middle of the space between the two clutches, where it will not be touched by either; also, so that the brake-lever will drop into the notch in the part O of the shifting-bar and the shoe R will come upon the collar J and hold the hammer until it is ready to be let down. When the hammer is let fall, which is done by pressing down the foot-treadle Y, which moves lever Q out of the notch in the shifting-bar, the bar S falls and the point of the stem of the switch goes down, say, on the right side of the pin $d$, which forces the pin, and with it the shifting-bar, to the left, bringing the spool into gear with the clutch F for raising the hammer again. In the fall of the bar S the end of pin $d$, coming against the oval head of pin $h$, forces it back so that its shoulder $k$ releases the switch; and before said pin $d$ escapes from $k$ it comes in contact with the under side of the head of the switch, and, forcing it upward, throws the stem of the switch to the left, and said stem passes over the head of pin $h$, keeping it pressed back and releasing pin $i$ so that it comes forward, and with its shoulder locks the switch in this position—that is, with its point inclining to the left—ready for coming down the next time on the left side of pin $d$ for throwing the spool to the right into gear with clutch E for the hammer to be again raised by it, and it is then set in the same manner, in the position in which it is represented in Fig. 5, for throwing the shifter to the left, as above described, when it again comes down. But before being reset in the said position shown the shifting-bar is moved to the right by the rising of bar S, when the hammer is raised by clutch F far enough to disconnect the spool after the hammer has been raised by said clutch F, with which the spool was clutched by the fall of the bar, as described. Thus it will be seen that at the same time, or during the same movement of the bar S by which the spool is caused to be clutched by the switch with one driving-wheel for the hammer to be raised, the switch is set for causing said spool to be clutched with the other driving-wheel by the next operation, and that said bar S first moves the spool from the driver by which the hammer was raised to the space between the two drivers, then to the opposite one, and vice versa; or, in other words, the spool goes in the same direction from the time the hammer begins to fall until it is raised again, so that the motion of the spool is not reversed when it is connected with the driving-power for raising the hammer, as in other drop-presses.

Figure 11:
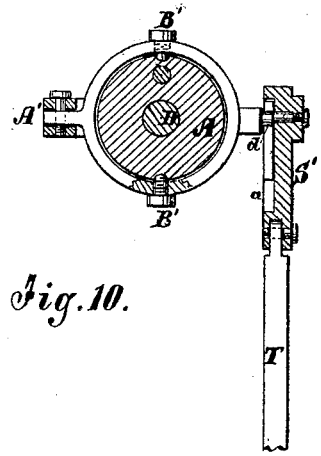

In Figs. 9, 10, and 11 I have represented a bar, S', with this shifting contrivance acting on the spool A by a lever, M', one end of which is pivoted at A', and the other terminates in a pin, $d$, working in the groove $a$, the said lever being pivoted to the spool between the ends, and said bar S' is pivoted to the frame at B' to have an oscillating movement instead of a rectilinear movement of the bar S, and the lifting-rod T is connected directly to bar S'. The plan upon which said shifting-gear works is, however, the same as that more particularly described before. Other modifications of the connecting devices may also be made as circumstances may require, and the said shifting apparatus may be applied to other machinery, where required, as well as to drop-presses. The friction-brake is forced upon the collar by a weight, C', suspended from the long arm of the lever Q by the rod D'. This weight is raised by the foot-treadle Y when it is desired to release the hammer to let it fall, and said weight is let fall by the notched bar M O, as soon as the spool is thrown out of the clutches, to throw the brake on the spool and prevent the hammer from falling. The friction-brake, being less positive in its action than the catch-lever, spring-stops, and the like apparatus commonly used with these hammers, catches the hammer with very much less jarring and straining than such contrivances. It is also preferable because of the facility with which it may be used to let the hammer down gradually to the anvil, as before stated. E is a hand-lever arranged in connection with the rod T for working the shifting-gear by hand when it may be required to do so, or by the foot-treadle by having said lever connected to it by a rod, $a^2$. The collar X is adjustable along the rod T to vary the height of the raising of the hammer, as in other machines.

Having thus described my invention, I claim as new and desire to secure by Letters Patent—

1. The bar S, raised indirectly by a hammer, the switch mechanism described, and the sliding bar M, in combination with spool A and the two side clutches revolving in opposite directions, as and for the purpose described.

2. The subject-matter of first claim in combination with the brake mechanism, substantially as described, and for the purpose set forth.

3. The sliding bar M having notched projection O, the friction-brake R, and the grooved collar J, (of spool,) combined, as and for the purpose set forth.

NORMAN C. STILES.

Witnesses:
T. B. MOSHER,
W. A. GRAHAM.